United States Patent
Sambhy et al.

(10) Patent No.: US 10,175,598 B1
(45) Date of Patent: Jan. 8, 2019

(54) FUSER FLUID BLEND

(71) Applicant: XEROX CORPORATION, Norwalk, CT (US)

(72) Inventors: Varun Sambhy, Pittsford, NY (US); David S Derleth, Webster, NY (US); Juan A Morales-Tirado, Henrietta, NY (US); Santokh S Badesha, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/682,656

(22) Filed: Aug. 22, 2017

(51) Int. Cl.
  *G03G 11/00* (2006.01)
  *C08L 83/04* (2006.01)
  *G03G 15/20* (2006.01)
  *G03G 5/147* (2006.01)

(52) U.S. Cl.
  CPC .............. *G03G 11/00* (2013.01); *C08L 83/04* (2013.01); *G03G 5/14773* (2013.01); *G03G 15/2017* (2013.01); *C08L 2205/02* (2013.01); *C08L 2205/03* (2013.01)

(58) Field of Classification Search
  CPC ........................... G03G 11/00; G03G 5/14773
  USPC ...................................................... 430/124.37
  See application file for complete search history.

(56) References Cited

U.S. PATENT DOCUMENTS

| | | | |
|---|---|---|---|
| 6,678,495 B1 * | 1/2004 | Badesha | C09D 127/16 399/320 |
| 6,808,814 B2 * | 10/2004 | Kaplan | G03G 15/2057 399/320 |
| 7,208,258 B2 | 4/2007 | Gervasi et al. | |
| 7,291,399 B2 | 11/2007 | Kaplan et al. | |
| 9,599,918 B2 | 3/2017 | Morales-Tirado et al. | |

* cited by examiner

*Primary Examiner* — Mark A Chapman
(74) *Attorney, Agent, or Firm* — Hoffman Warnick LLC

(57) ABSTRACT

A release agent material including a blend of a nonfunctional siloxane release agent fluid and at least two different organo-functional siloxane release agent materials having amino-functional groups or alkyl functional groups, useful in machines having gamut extension capability.

15 Claims, 5 Drawing Sheets

401 → SINGLE PASS (1 PASS) FIX = 1 $\Delta L^* = 15$
NOT A SOLUTION DUE TO LACK OF K MASS 402 → MANUAL MULTI-PASS (2 PASS) POOR FIX WITH MAINLINE FF2 OIL $\Delta L^* = 6$ 403 → SW MULTI-PASS (3 PASS) POOR FIX WITH MAINLINE FF2 OIL $\Delta L^* = 10$ Multipass IOI Print Mode

FUSER FLUID BLEND

BACKGROUND

The disclosure herein relates to fuser members useful in electrostatographic reproducing apparatuses, including digital, image on image, and contact electrostatic printing and copying apparatuses. More specifically, the disclosure herein relates to extended gamut machines or machines having the ability to create specialized colors or coatings. The present fuser members may be used as fuser members, pressure members, transfuse or transfix members, and the like. In an embodiment, the fuser members comprise an outer layer comprising a polymer and deposited thereon, a liquid release agent. In embodiments, the release agent is a blend or mixture of an amino functional siloxane release agent and an alkyl-functional siloxane release agent. In embodiments, the amino-functional siloxane release agent comprises a pendant functional amino group. In embodiments, a non-functional siloxane release agent is used in the blend. The resulting fuser oil enables improved fixing of specialized colors and/or coatings in an extended gamut machine.

In a typical electrostatographic reproducing apparatus, a light image of an original to be copied is recorded in the form of an electrostatic latent image upon a photosensitive member, and the latent image is subsequently rendered visible by the application of toner or other marking material. The visible toner image is then in a loose powdered form and can be easily disturbed or destroyed. The toner image is usually fixed or fused upon a support, which may be the photosensitive member itself, or other support sheet such as plain paper.

The use of thermal energy for fixing toner images onto a support member is well known. To fuse electroscopic toner material onto a support surface permanently by heat, it is usually necessary to elevate the temperature of the toner material to a point at which the constituents of the toner material coalesce and become tacky. This heating causes the toner to flow to some extent into the fibers or pores of the support member. Thereafter, as the toner material cools, solidification of the toner material causes the toner material to be firmly bonded to the support.

Typically, the thermoplastic resin particles are fused to the substrate by heating to a temperature of between about 90° C. to about 200° C. or higher depending upon the softening range of the particular resin used in the toner. It may be undesirable to increase the temperature of the substrate substantially higher than about 250° C., because of the tendency of the substrate to discolor or convert into fire at such elevated temperatures, particularly when the substrate is paper.

Several approaches to thermal fusing of electroscopic toner images have been described. These methods include providing the application of heat and pressure substantially concurrently by various means, a roll pair maintained in pressure contact, a belt member in pressure contact with a roll, a belt member in pressure contact with a heater, a drelt (a combination of a drum and a belt) and the like. Heat may be applied by heating one or both of the rolls, plate members, or belt members. The fusing of the toner particles takes place when the proper combinations of heat, pressure and contact time are provided. The balancing of these parameters to bring about the fusing of the toner particles is well known in the art, and can be adjusted to suit particular machines or process conditions.

To ensure and maintain good release properties of the fuser member and to decrease the occurrence of hot offset, it has become customary to apply release agents to the fuser member during the fusing operation. Typically, these materials are applied as thin films of, for example, nonfunctional silicone oils or mercapto- or amino-functional silicone oils, to prevent toner offset.

U.S. Pat. No. 7,208,258 to Gervasi et al. discloses the use of a fuser member and a blend of two different amine-functional polyorganosiloxanes as release agents.

U.S. Pat. No. 7,291,399 to Kaplan et al. discloses a fuser member in combination with a blended polyorganosiloxane fluid wherein fluids with both mercapto-functional and amine-functional groups are utilized.

Clear toner U.S. Pat. No. 9,599,918 to Morales-Tirado et al. discloses a clear toner composition for use in offset printing.

In high-speed color fusing applications, adequate coverage of the fuser member surface is required to meet the demanding environmental conditions and exposure to various levels of toner materials and additives, rapid high temperature thermal cycling and various media composition and weights. Amino silicone release agents are typically used in such high-speed color fusing systems, due to their ability to sufficiently react with the fluoroelastomer surface coatings that are used in conventional fuser member component compositions.

Most high-speed electrophotographic printing systems are embodied by four colors of toner in the development subsystem. These toner colors are most commonly cyan, magenta, yellow, and black. There is a need for expanded color gamut or additional image effects which may include the use of a fifth color station or development housing incorporating the use of clear, white, violet, green, orange, blue, fluorescent, and the like, or toner compositions of custom colors. Additional printing system failure modes may be introduced when expanding a printing system to include a fifth housing for additional toner configurations. In embodiments, high-speed electrostatographic color printing systems include a fifth station to provide a secondary imaging operation whereby added effect or color gamut expansion is enabled by the deposition of a fifth toner after a first fusing step. This results in a thin layer of amine-functional siloxane release agent on the surface of the fused print, which is subsequently re-introduced into the development system and the fusing system a second time. The thin layer of oil on the surface of the fused print inhibits adhesion of the toner from the second printing operation to the surface of the print.

Therefore, is desired to provide a fuser member release agent that provides sufficient wetting, while maintaining and enabling sufficient fix and toner adhesion to prints throughout all steps of a multi-pass printing operation. It is further desired that the release agent results in a decrease or elimination of gelation. It is desired to provide a release agent that inhibits adhesion of the toner from the second printing operation to the surface of the print. Moreover, it is desired that the release agent increase the life of the fuser member, thereby resulting in a cost savings and increased satisfaction to the customer.

SUMMARY

The present disclosure provides illustrative examples of release agent, or fuser oil material compositions that enable improved image permanence, or fix level in an electrophotographic printing system, particularly in electrophotographic printing systems capable of extended color gamut or specialty colors or effects.

In one aspect, a release agent material for use in fusing in electrostatographic machines having the capability of gamut extension are provided. In embodiments, a release agent material composition is a blend of an amino functional silicone fluid, an alkyl functional silicone fluid, and a non-functional silicone fluid.

In another aspect, an image forming apparatus including a photoreceptor having a photosensitive layer, a charging device which charges the photoreceptor, an exposure device which exposes the charged photoreceptor to light, thereby forming an electrostatic latent image on a surface of the photoreceptor; and at least 5 developer stations for developing at least 5 toner images on a surface of the photoreceptor; at least one transfer device for transferring the toner images to a recording medium; a fuser station for fixing the toner images transferred to the recording medium, onto the recording medium by heating the recording medium, thereby forming a fused image on the recording medium; and wherein the fuser station includes a fuser member, a pressure member and a release agent material in combination with the fuser member.

In another aspect, a copy or print substrate composed of a marking material layer, a release agent material blend coating layer, and an outer marking material layer positioned over the release agent coating layer is provided. This release agent coating layer is composed of a blend of an alkyl functional silicone fluid, an amino functional silicone fluid, and a non-functional silicone fluid.

BRIEF DESCRIPTION OF THE DRAWINGS

For a better understanding of the disclosure herein, reference may be had to the accompanying figures.

DETAILED DESCRIPTION

The present disclosure relates to fuser members having a liquid release agent or fuser oil in combination therewith. The fuser member has an outer layer in combination with an organo-functional blended release agent. The present liquid release agent is an amino-functional release agent. Embodiments of the release agent herein results in a decrease or elimination of gelation, even when used in color fusing. The present organo-functional blended release agent forms a chemical bond with the outer fusing surface, which provides a renewable release layer that allows the fused image to freely detach from the surface of the fuser member upon exit from the high pressure, high temperature fuser nip. The organo-functional blended release agent is especially useful in high performance, fast and full process color printer and copy machines. In addition, the blended release agent, in embodiments, provides release while increasing oil diffusion into the surface of the print, leaving less residue on the printed surface compared to known amino-functional release agents. Moreover, the organo-functional release agent, in embodiments, increases the life of the fuser member, thereby resulting in a cost savings and increased satisfaction to the customer. The release agent herein provides, in embodiments, sufficient wetting, while maintaining and enabling sufficient fix and toner adhesion to prints throughout all steps of a multi-pass printing operation. In further embodiments, the release agent herein results in a decrease or elimination of gelation, and inhibits adhesion of the toner from the second printing operation to the surface of the print.

Figure 1:
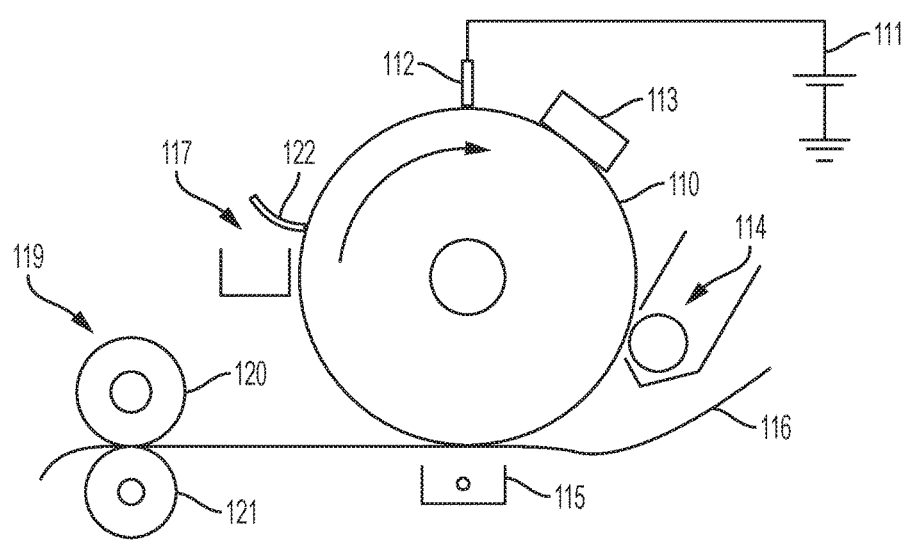
FIG. 1 is a schematic illustration of an image apparatus in accordance with the present disclosure.

Referring to FIG. 1, in a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. Specifically, photoreceptor 110 is charged on its surface by means of a charger 112 to which a voltage has been supplied from power supply 111. The photoreceptor is then imagewise exposed to light from an optical system or an image input apparatus 113, such as a laser and light emitting diode, to form an electrostatic latent image thereon. Generally, the electrostatic latent image is developed by bringing a developer mixture from developer station 114 into contact therewith. Development can be effected by use of a magnetic brush, powder cloud, or other known development process. A dry developer mixture usually comprises carrier granules having toner particles adhering triboelectrically thereto. Toner particles are attracted from the carrier granules to the latent image forming a toner powder image thereon. Alternatively, a liquid developer material may be employed, which includes a liquid carrier having toner particles dispersed therein. The liquid developer material is advanced into contact with the electrostatic latent image and the toner particles are deposited thereon in image configuration.

After the toner particles have been deposited on the photoconductive surface, in image configuration, they are transferred to a copy sheet 116 by transfer means 115, which can be pressure transfer or electrostatic transfer. Alternatively, the developed image can be transferred to an intermediate transfer member, or bias transfer member, and subsequently transferred to a copy sheet. Examples of copy substrates include paper, transparency material such as polyester, polycarbonate, any plastic, or the like, cloth, wood, or any other desired material upon which the finished image will be situated.

After the transfer of the developed image is completed, copy sheet 16 advances to fusing station 119, depicted in FIG. 1 as fuser roll 120 and pressure roll 121 (although any other fusing components such as fuser belt in contact with a pressure roll, fuser roll in contact with pressure belt, and the like, are suitable for use with the present apparatus), wherein the developed image is fused to copy sheet 116 by passing copy sheet 116 between the fusing and pressure members, thereby forming a permanent image. Alternatively, transfer and fusing can be effected by a transfix application.

Photoreceptor 110, subsequent to transfer, advances to cleaning station 117, wherein any toner left on photoreceptor 110 is cleaned therefrom by use of a blade 122 (as shown in FIG. 1), brush, or other cleaning apparatus.

Figure 2:
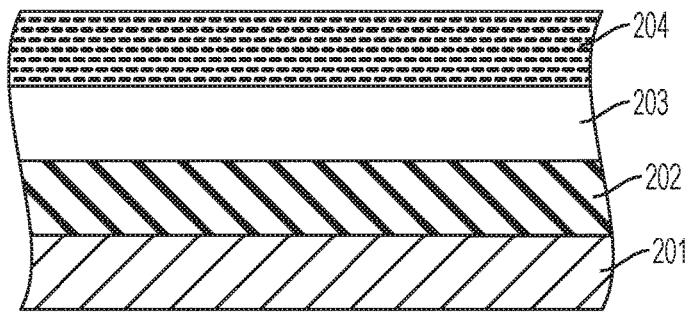
FIG. 2 is an enlarged, side view of an embodiment of a fuser member, showing a fuser member with a substrate, intermediate layer, outer layer, and release agent coating layer and an outer gamut extension layer.

FIG. 2 is an enlarged schematic view of an embodiment of a fuser member, demonstrating the various possible layers. As shown in FIG. 2, substrate 201 has an optional intermediate layer 202 thereon. Intermediate layer 202 can be, for example, a rubber such as silicone rubber or other suitable material. An optional intermediate layer 202 is positioned outer layer 203, which comprises a polymer such as those described below. Positioned on outer layer 203 is outermost liquid amino-functional siloxane release layer 204.

Examples of the outer surface polymers of the fuser system members include fluoropolymers such as fluoroelastomers and hydrofluoroelastomers.

Specifically, suitable fluoroelastomers are those described in detail in U.S. Pat. Nos. 5,166,031, 5,281,506, 5,366,772 and 5,370,931, together with U.S. Pat. Nos. 4,257,699, 5,017,432, 5,061,965, 9,056,958 and 9,187,587. As described therein, these elastomers are from the class of 1) copolymers of two of vinylidenefluoride, hexafluoropropylene and tetrafluoroethylene (known commercially as VITON® A); 2) terpolymers of vinylidenefluoride, hexafluoropropylene and tetrafluoroethylene (known commercially as VITON® B); and 3) tetrapolymers of vinylidenefluoride, hexafluoropropylene, tetrafluoroethylene and cure site monomer (known commercially as VITON® GF). Examples of commercially available fluoroelastomers include those sold under various designations such as VITON® A, VITON® B, VITON® E, VITON® E600, VITON® GF, and the like. The VITON® designation is a trademark of Chemours, Inc. The cure site monomer can be 4-bromoperfluorobutene-1, 1,1-dihydro-4-bromoperfluorobutene-1, 3-bromoperfluoropropene-1, 1,1-dihydro-3-bromoperfluoropropene-1, or any other suitable, known cure site monomer. These listed are commercially available from DuPont. The fluoroelastomer VITON GF® has relatively low amounts of vinylidenefluoride. The VITON GF® has about 35 weight percent of vinylidenefluoride, about 34 weight percent of hexafluoropropylene, about 29 weight percent of tetrafluoroethylene with about 2 weight percent cure site monomer.

Other commercially available fluoropolymers include FLUOREL®, including grades denoted as FT-2350, FX-9143, FT-2481, FT-2430, FPO-3520, and the like. FLUOREL® is a trademark of the 3M Dyneon Company. Additional commercially available materials include Tecnoflons®, identified as FOR-532, FOR-531, FOR-539, FOR-5312K, FOR-60K/U, FOR-7380K, FOR-4353, and FOR-7353, and the like, available from Solvay, Inc.

Examples of other fluoropolymers include fluoroplastics or fluoropolymers such as polytetrafluoroethylene, fluorinated ethylene propylene resin, perfluoroalkoxy, and other TEFLON®-like materials, and polymers thereof.

In embodiments, a fluoroelastomer can also be blended or copolymerized with non-fluorinated ethylene or non-fluorinated propylene.

Examples of suitable silicone rubbers include high temperature vulcanization (HTV) silicone rubbers and low temperature vulcanization (LTV) silicone rubbers. These rubbers are known and readily available commercially such as SILASTIC® 735 black RTV and SILASTIC® 732 RTV, both from Dow Corning; and 106 RTV Silicone Rubber and 90 RTV Silicone Rubber, both from General Electric. Other suitable silicone materials include the siloxanes (such as polydimethylsiloxanes); fluorosilicones such as Silicone Rubber 552, available from Sampson Coatings, Richmond, Va.; liquid silicone rubbers such as vinyl crosslinked heat curable rubbers or silanol room temperature crosslinked materials; and the like. Another specific example is Dow Corning Sylgard 182.

The amount of fluoroelastomer or fluoropolymer material in solution in the outer layer solution, in weight percent total solids, is from about 10 to about 25 percent, or from about 16 to about 22 percent by weight of total solids. Total solids as used herein include the amount of polymer, dehydrofluorinating agent (if present) and optional adjuvants and fillers.

An inorganic particulate filler may be used in connection with the polymeric outer layer, in order to provide anchoring sites for the functional groups of the fuser agent. Examples of suitable fillers include inorganic fillers such as silicas or a metal-containing filler, such as a metal, metal alloy, metal oxide, metal salt, or other metal compound. The general classes of metals which can be used include those metals of Groups 1 b, 2a, 2b, 3a, 3b, 4a, 4b, 5a, 5b, 6b, 7b, 8, and the rare earth elements of the Periodic Table. For example, the filler can be an oxide of aluminum, copper, tin, zinc, lead, iron, platinum, gold, silver, antimony, bismuth, zinc, iridium, ruthenium, tungsten, manganese, cadmium, mercury, vanadium, chromium, magnesium, nickel and alloys thereof. Other specific examples include inorganic particulate fillers of aluminum oxide, and cupric oxide; reinforcing and non-reinforcing calcined alumina and tabular alumina, respectively, along with silicas. Other fillers include various forms of carbon, such as carbon nanotubes, graphene or other forms of carbon; and doped metal oxides such as antimony-doped tin oxide, indium-doped tin oxide, and the like. The filler may include just one filler or a mixture of fillers.

The thickness of the outer polymeric surface layer of the fuser member herein is from about 10 to about 250 micrometers, or from about 5 to about 100 micrometers, or from about 2 to about 20 micrometers.

Optional intermediate adhesive layers and/or intermediate polymer or elastomer layers may be applied to achieve desired properties and performance objectives of the embodiments herein. The intermediate layer may be present between the substrate and the outer polymeric surface. Examples of suitable intermediate layers include silicone rubbers such as room temperature vulcanization (RTV) silicone rubbers; high temperature vulcanization (HTV) silicone rubbers and low temperature vulcanization (LTV) silicone rubbers. These rubbers are known and readily available commercially such as SILASTIC® 735 black RTV and SILASTIC® 732 RTV, both from Dow Corning; and 106 RTV Silicone Rubber and 90 RTV Silicone Rubber, both from General Electric. Other suitable silicone materials include the siloxanes (such as polydimethylsiloxanes); and the like. Another specific example is Dow Corning Sylgard 182. An adhesive intermediate layer may be selected from, for example, epoxy resins and polysiloxanes.

There may be provided an adhesive layer between the substrate and the intermediate layer. There may also be an adhesive layer between the intermediate layer and the outer layer. In the absence of an intermediate layer, the polymeric outer layer may be bonded to the substrate via an adhesive layer.

The thickness of the intermediate layer is from about 0.5 to about 20 mm, or from about 1 to about 10 mm, or from about 3 to about 5 mm.

Multipass Printing with Extended Gamut or Custom Toner Printing

Figure 3:
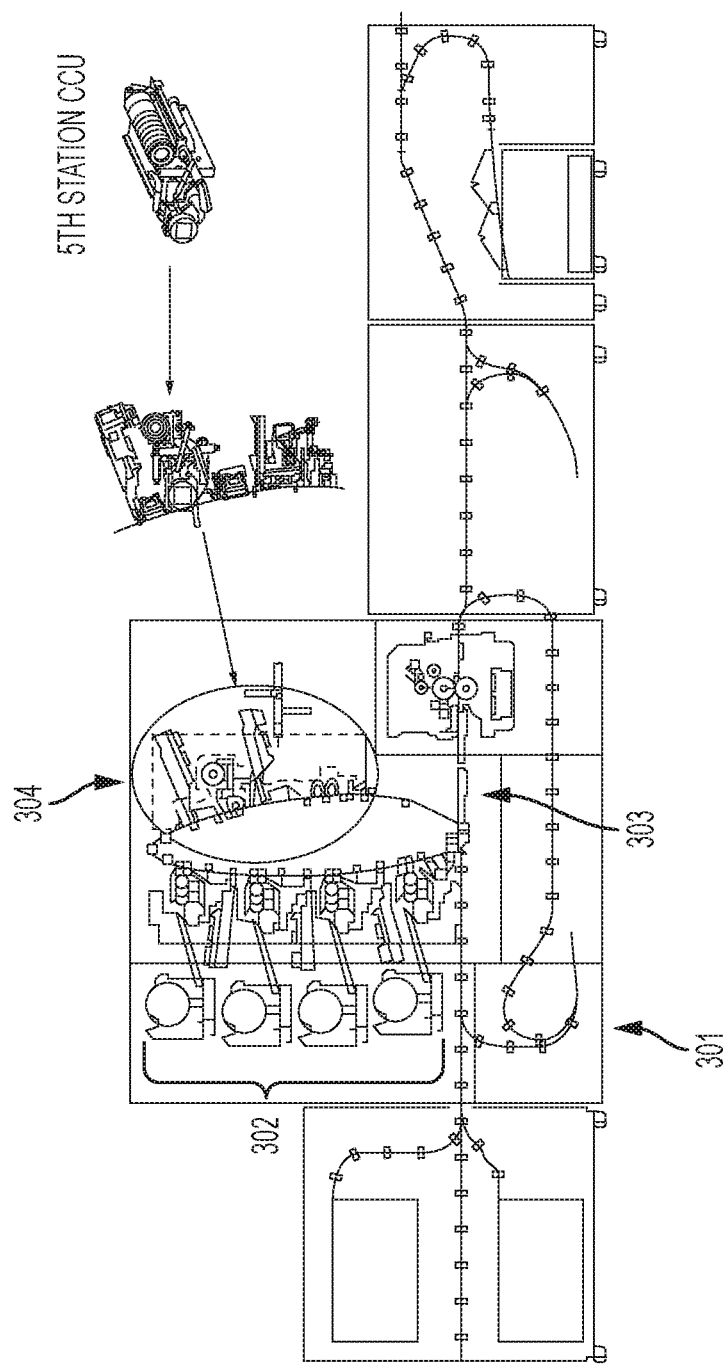
FIG. 3 is a side view of an exemplary printing system with a customer changeable modular unit to enable color swapping for gamut extension.

Implementing specialty toners for the purpose of special effects or gamut extension for use in machines such as those sold under the tradename iGen® platform (clear, white, metallic, fluorescent, orange, violet, green, and the like) in an additional or fifth developer housing may require multipass printing. FIG. 3 depicts an embodiment of a printing system architecture having a fifth customer replaceable unit (304) for adding an additional specialty toner to an existing printing system configuration (301).

Figure 4:
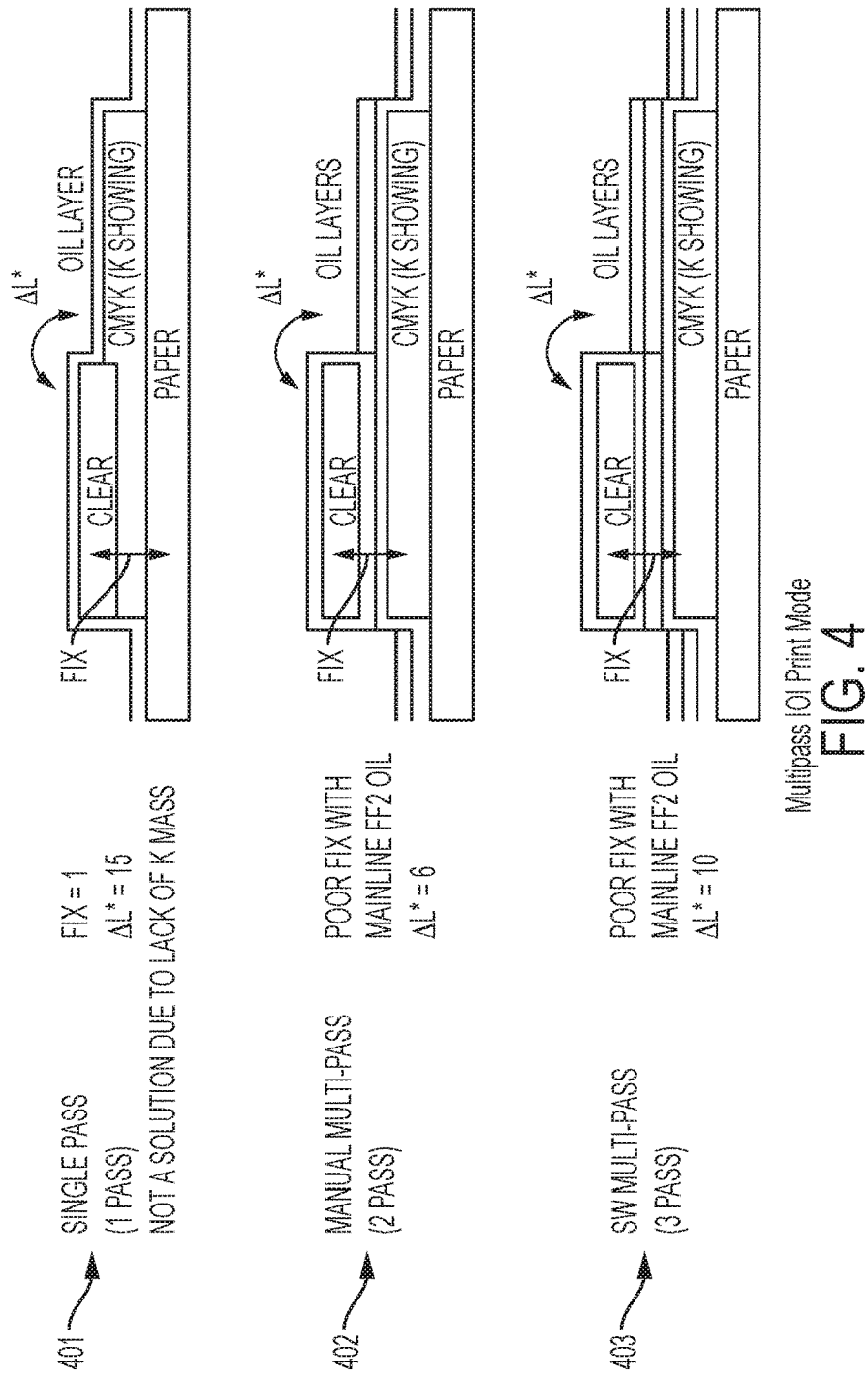
FIG. 4 is a diagram depicting the present understanding of multi-pass IOI print mode and potential Issues with clear or gamut extension toner.

FIG. 4 is a depiction of several printing modes in an exemplary high-speed color printing system. In a single pass printing mode as depicted in 401, lowered mass of black toner result in unacceptable print quality and image density, while achieving sufficient fix levels and image permanence.

Multi-pass printing refers to a printing operation wherein a substrate is passed through the entire printing process where an image is printed onto the substrate, followed by a secondary pass of the same side of the same substrate through the printing process for the purpose of printing an additional layer of toner onto the substrate. This operation can be conducted manually as depicted in 402, or automatically, as depicted in 403. In multi-pass Image on Image (IOI) print mode (403), a toner layer is developed on top of a fused CMYK patch. Upon entering the secondary pass through the print process, a layer of release agent sometimes remains on the surface of the printed substrate, which may interfere with toner adhesion to the surface of the previously printed substrate. The oil layer on top of the fused CMYK patch prevents the overlying clear toner layer from getting adequately fixed to the patch below (clear tone to CYMK patch adhesion). As result, the specialized toner can be easily scratched off and is unacceptable for customers. The release agent or release oil adhesion issue may be a challenge to successful implementation of the overall printing platform, leading to poor image fix and quality or customer satisfaction. In addition to specialized toner, it will be necessary to resolve this multipass toner on fused patch fix issue to implement other specialty colors, for example, white, metallic silver, metallic gold, fluorescent security toner, and the like.

Embodiments herein propose to use a blend composition containing an alkyl-functional siloxane and amine-functional siloxane oil blend as a fuser member release agent to enable good clear toner fix, and in embodiments, when used on fused CMYK patch in multi-pass IOI print mode. The amine groups on the presently used amine-functional silicone oil prevent the bulk oil layer from diffusing quickly into the fused toner patch bulk in time for the secondary printing step. Amine groups are known to be highly reactive and may form both covalent and non-covalent interactions with the toner patch surface as well as the paper surface, thereby slowing their diffusion from the fused patch surface into the bulk of the substrate. The oil remains on the fused toner patch surface preventing good fix of the clear toner to the patch. If the fused prints are allowed to stand for up to 24 hours prior to developing the clear or secondary toner layer on the surface of a fused print, the fix issue is resolved. In addition, heating fused patches in an oven at from about 80° C. to about 140° C. or at 125° C. to speed up oil migration from surface into the toner patch bulk has similar positive impact on the fix. However, these potential processes are not an acceptable solution for customers. Embodiments of the blended release agent enable, excellent fix of clear toner on CMYK fused images in multi-pass IOI mode for iGen and similar printing systems.

Blending and Use

The release agents or fusing oils described herein are provided onto the outer layer of the fuser member via a delivery mechanism such as a delivery roll, belt, or like fusing member. The delivery roll is partially immersed in a sump, which houses the fuser oil or release agent. The amino-functional oil is renewable in that the release oil is housed in a holding sump and provided to the fuser roll when needed, optionally by way of a release agent donor roll in an amount of from about 0.1 to about 20 mg/copy, or from about 1 to about 12 mg/copy. The system by which fuser oil is provided to the fuser roll via a holding sump and optional donor roll is well known. The release oil may be present on the fuser member in a continuous or semicontinuous phase. The fuser oil in the form of a film is in a continuous phase and continuously covers the fuser member.

The blended release agent material described herein includes a release agent comprising a) an alkyl functional silicone oil; b) an amino functional silicone oil; and c) a non-functional silicone oil.

Functional Oil

A functional oil, as used herein, refers to a release agent having functional groups that chemically react with the fillers present on the surface of the fuser member, so as to reduce the surface energy of the fillers so as to provide better release of toner particles from the surface of the fuser member. In embodiments, the functional oil may chemically react with the polymer surface of the fuser member via inherent chemical functionality in the polymer backbone of one of the components in the fuser member surface polymer formulation. If the surface energy is not reduced, the toner particles will tend to adhere to the fuser member surface or to filler particles on the surface of the fuser member, which will result in copy quality defects. Organo-functional oil refers to oils having functional groups commonly used or observed in organic chemistry compositions or applications thereof. The main polymeric structure of release agents or oils used in xerographic printing applications is commonly silicone, which may also be referred to as polyorganosiloxane or siloxane.

Amino-Functional Silicone Oil

Examples of suitable amino-functional release agent materials include those having pendant amino groups, such as those having the following Formula I:

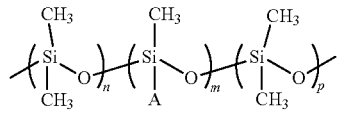

Formula I wherein

A represents —$R_1$—X; and $R_1$ represents an alkyl group having from about 1 to about 10 carbons, or from about 1 to about 8 carbons, or from about 1 to about 3 carbons, such as methyl, ethyl, propyl, and the like;

X represents —$NH_2$ or —$NHR_2NH_2$ with $R_2$ being as described as $R_1$ above and can be the same or similar thereto.

In embodiments, the pendant group is mono-amino, di-amino, tri-amino, tetra-amino, penta-amino, hexa-amino, hepta-amino, octa-amino, nona-amino, deca-amino, and the like. In embodiments, the amino group is D-amino (pendant to the chain), or the like.

In embodiments, the amino-functional release agent is a pendant D-amino functional release agent, wherein in the above Formula I, n is from about 1 to about 50, or from about 1 to about 25 or from about 1 to about 10; and p is from about 10 to about 5,000, or from about 50 to about 1000 or from about 100 to about 1000.

In embodiments, X represents —$NH_2$, and in other embodiments, $R_1$ is propyl. In embodiments, X represents —$NHR_2NH_2$, and in embodiments, $R_2$ is propyl.

In embodiments, the amino-functional siloxane fluid used in the blend described herein is pre-blended to a specific amine content and viscosity using an amine-functional concentrate fluid and one or more non-functional diluent fluids. For example, Fuser Fluid II, Xerox Product No. 8R13095 is received as a pre-blended amine-functional fuser fluid having about 0.24 mol % amine and a viscosity of from about 300 to about 1200 or from about 400 to about 700 or from about 500 to about 700 centipoise.

In embodiments, the pre-blended amine concentration of the oil is polymerized such that m in Formula I results in a polymer where the resulting mole percent amine is from about 0.01 to about 0.9 mole percent, or from about 0.03 to about 0.6 mole percent, or from about 0.06 to about 0.30 mole percent. Mole percent amine refers to the relationship:

100×(moles of amine groups/moles of silicon atoms)

Alkyl Functional Silicone Oil

Examples of suitable alkyl-functional release agent materials include those having pendant alkyl groups, such as those having the following Formula II:

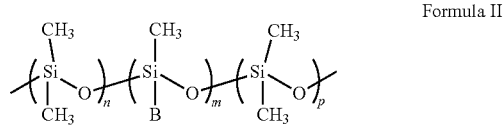

Formula II wherein

B represents —$(CH_2)_x$—$CH_3$; and x=0 to 17.

In embodiments, the alkyl-functional release agent is a pendant dodecyl functional release agent, wherein in the above Formula II, n is from about 1 to about 50, or from about 1 to about 25 or from about 1 to about 10; and m is from about 10 to about 5,000, or from about 50 to about 1000 or from about 100 to about 1000.

In embodiments, the alkyl-functional fluid is polymerized such that m in Formula II results in a polymer where the resulting mole percent of alkyl group concentration is from about 1 to about 25 mole percent, or from about 25 to about 50 mole percent, or from about 50 to about 100 mole percent. The GM161 oil, from Wacker Silicones, is ~22.5 mol % alkyl. Mole percent alkyl refers to the relationship:

100×(moles of alkyl groups/moles of silicon atoms)

Non-Functional Oil

A non-functional oil, as used herein, refers to oils that do not have chemical functionality which interacts or chemically reacts with the surface of the fuser member or with fillers on the surface. Non-functional oils or fluids also refer to siloxane or silicone based fluids having no pendant or terminal functional groups other than methyl groups, or some negligent amount of residual functionality still present from polymerization starting materials. Non-functional oils, in embodiments, are used in release agents to dilute a release agent formulation to a target viscosity or functionality level of the other components desired for a specific application or use.

Non-functional fluids may be described by the following Formula III:

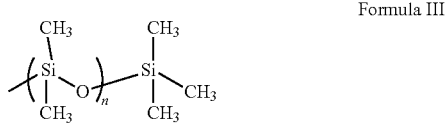

Formula III wherein n is from about 10 to about 5000, or from about 50 to about 1000, or from about 100 to about 1000, resulting in a fluid viscosity of from about 10 to about 10000, or from about 10 to about 1000, or from about 10 to about 500 centipoise.

Additional Properties of Blended Oil

In embodiments, the oil has a molecular weight (Mw) of from about 1,000 to about 100,000, or from about 1,000 to about 10,000 daltons and a viscosity of from about 10 to about 1,500 cS, or from about 50 to about 1,000 cS.

Scratch Test

The scratch test is performed by the operator manually scratching a toner patch with his or her fingernails. The scratch test is an SIR based on grading the magnitude of scratches seen on the print 1 to 5, with 1 being least easily scratched and 5 being most easily scratched.

The following Examples further define and describe embodiments of the present disclosure. Unless otherwise indicated, all parts and percentages are by weight.

EXAMPLES

Example 1: Preparation and Use of Fuser Fluid II (FF2) Oil

An amount of standard mainline Fuser Fluid II (FF2, product number 8R13095) Release Agent, an amine-functional siloxane, was used in experimentation and printing testing as received. Further details of testing may be necessary.

Example 2: Preparation of Alkyl Silicone-Amino Silicone Oil Blend

Figure 5:
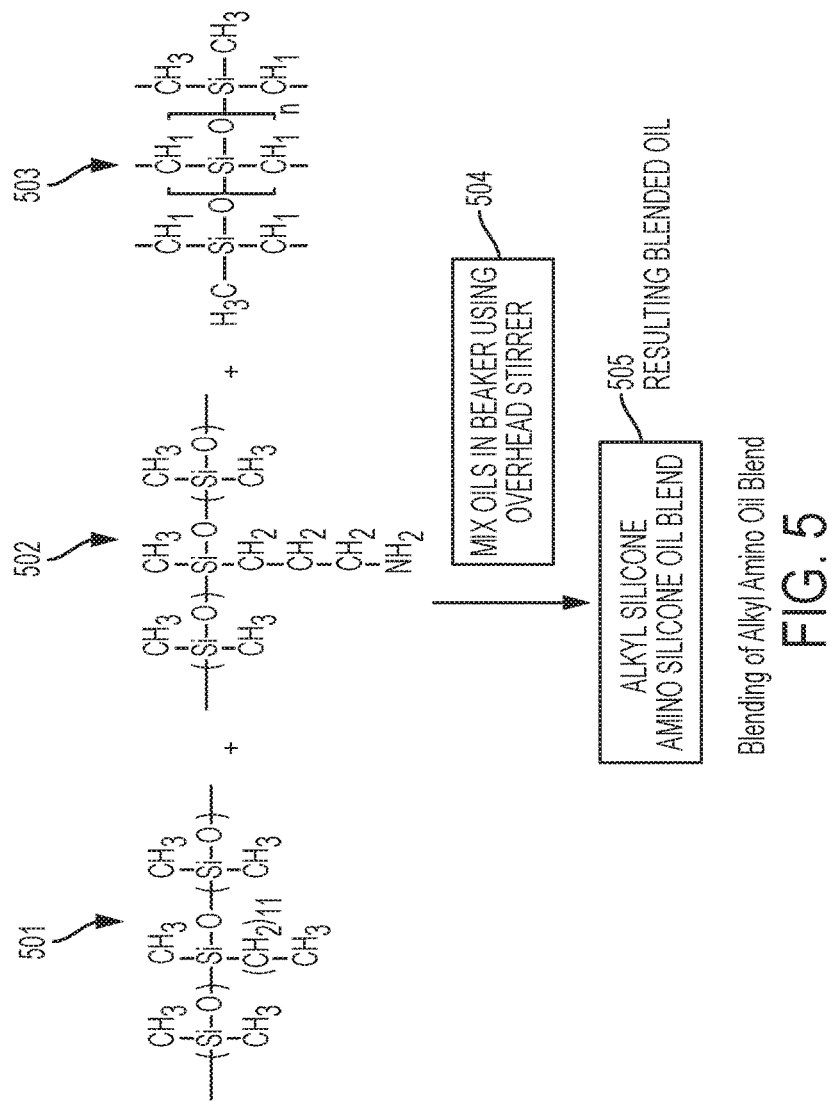
FIG. 5 is a depiction of the blending process of an exemplary alkyl amino siloxane oil blend.

An alkyl silicone-amino silicone oil blends was prepared by simply mixing an 1000 g alkyl functional silicone oil (GM161 available from Wacker), 700 g amine functional silicone oil (AK 273 available from Wacker) and 1300 g nonfunctional silicone oil (AK300 available from Wacker) in a bucket using an overhead stirrer. A general process for such a blending operation is depicted in FIG. 5.

The final amine mol %, alkyl mol % and viscosity of the alkyl amino oil blends made as described above is given in Table 1 below. The oil blends were tested for clear toner fusing performance in an iGen machine in multipass mode. In multipass mode testing a black patch is printed on paper in the $1^{st}$ pass printing. Clear toner is then printed on top of this black patch in a $2^{nd}$ pass of printing.

TABLE 1

Properties of Oil Blends

| Oil iD# | Amine mol % | Alkyl mol % | Viscosity (cS) |
|---|---|---|---|
| 1 | 0.07 | 7.4% | 450 cS |

The amine mol % and alkyl mol % and viscosity were calculated using the specifications of the starting materials. These properties may be confirmed utilizing Nuclear Magnetic Resonance (NMR) for blended functional level or a viscometer by Brookfield or similar viscometer to confirm blended viscosity.

Example 3: Comparative Testing of Clear Toner Performance in 5th Station iGen—Alkyl Oils Vs. Mainline Fuser Fluid II (FF2) Oil Machine Test Results The print tests were done on an iGen machine having a 5th station running clear toner. The oil delivery RAM and fuser components were cleaned thoroughly before swapping and testing oils. In the iGen machine test 100% solid black toner patches were printed on DCE120 and DCE280 paper. Clear toner was then developed and fused on top of the 100% black patch in a multipass mode. The prints were then analyzed for critical clear toner adhesion metrics (see Tables 2 and 3 below).

The alkyl amino oil blends disclosed herein yielded prints that had significantly better clear toner to black toner adhesion performance than fuser fluid 2 (FF2) control oil as indicated by low scratch SIR rating of 1 on both DCE120 and DCE280 paper. Control FF2 oil yielded prints which had very poor clear toner to black toner adhesion with high scratch SIR rating of 5.

All of the oil blends disclosed herein yielded prints that had lower or similar delta L* performance than FF2 control oil on both DCE120 and DCE280 paper. Delta L* is defined as the difference in L* between a black patch without a clear toner layer on top and a black patch having clear toner layer on top. A lower delta L* is desirable to the customer as it indicates a lower shift in color fidelity between prints having clear toner on top and prints having no clear toner.

TABLE 2

Clear toner performance on Digital Color Elite 120 GSM Paper

| Oil iD# | Scratch SIR | Delta Gloss | Delta L* |
|---|---|---|---|
| Alkyl Amino blend | 1 | −10 | 5.5 |
| FF2 Control | 5 | 6.6 | 8.52 |

TABLE 3

Clear toner performance on Digital Color Elite 280 GSM Paper

| Oil iD# | Scratch SIR | Delta Gloss | Delta L* |
|---|---|---|---|
| Alkyl Amino blend | 1 | −5 | 2.1 |
| FF2 Control | 5 | −6 | 7.76 |

Scratch—

This is SIR value indicating degree to which the clear toner layer can be scratched off. A SIR of 1 indicates the clear toner is very well fixed to the black patch and cannot be scratched off. An SIR of 5 indicates the clear toner layer can be easily scratched off and has poor fix. The alkyl silicone-amino silicone oil blend had excellent scratch and fix properties (SIR of 1) as compared to the FF2 control (SIR of 5). Thus clearly the alkyl silicone-amino silicone oil blend is enabling very good fix for 5$^{th}$ station toner (clear) in multipass IOI print mode.

Delta L*—

This is the difference in L* between a black patch and a black patch with clear on top. Ideally we want a delta L* of zero so there is no color shift of the image after putting clear on top. The alkyl silicone-amino silicone oil blend had lower delta L* than the current mainline FF2 oil, which is desirable.

While the invention has been described in detail with reference to specific and preferred embodiments, it will be appreciated that various modifications and variations will be apparent to the artisan. All such modifications and embodiments as may readily occur to one skilled in the art are intended to be within the scope of the appended claims.

What is claimed is:

1. A release agent material for use in fusing in electrostatographic machines having the capability of gamut extension, said release agent material comprising:

a) an amino functional silicone fluid wherein the amino functional silicone fluid has the following Formula I:

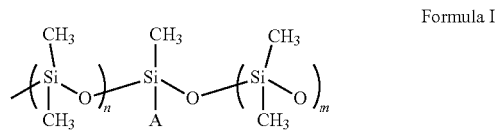

Formula I wherein A represents —R$_1$—X, wherein R$_1$ represents an alkyl group having from about 1 to about 10 carbons, and wherein X represents —NH$_2$ or —NHR$_2$NH$_2$ with R$_2$ having the same description as R$_1$;

b) a alkyl functional silicone fluid wherein the alkyl functional silicone fluid has the following Formula II:

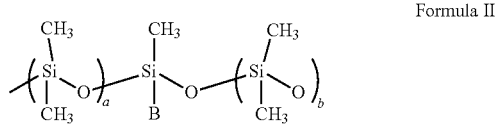

Formula II wherein B represents —(CH2)x-CH3, wherein x=0 to 17; a is from about 1 to about 11; and b is from about 10 to about 1,000; and c) a non-functional silicone fluid wherein the non-functional silicone fluid has the following Formula III:

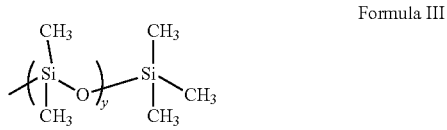

Formula III wherein y is from about 10 to about 5000;

wherein said release agent material has a viscosity of from about 50 to about 1000 centipoise, and the release agent material present on a final copy substrate demonstrates an scratch test result of from about 1 to about 2.

2. The release agent material in accordance with claim 1, wherein the A represents an aminoethyl aminopropyl amine functional group.

3. The release agent material in accordance with claim 1, wherein the mole percent of amine in an amino functional silicone oil of Formula I is from about 0.05 to about 0.25 mole percent.

4. The release agent material in accordance with claim 1, wherein the B represents a dodecyl —(CH2)$_{11}$—CH$_3$ functional group.

5. The release agent material in accordance with claim 4, wherein the mole percent of dodecyl is from about 5 to about 30 mole percent.

6. The release agent material in accordance with claim 1, wherein the viscosity is from about 100 to about 400 centipoise.

7. The release agent material in accordance with claim 1, wherein a viscosity of the non-functional silicone fluid is from about 10 to about 500 centipoise.

8. The release agent material in accordance with claim 1, wherein said an amino functional silicone fluid, alkyl functional silicone fluid, and non-functional silicone fluid are present in a ratio of from about 5:5:10 to about 30:15:55.

9. The release agent material of claim 1, wherein said amino functional silicone fluid has a molecular weight (Mw) of from about 1000 to about 100000, an Mn of from about 1000 to about 100000 and a polydispersity of from about 1 to about 5.

10. The release agent material of claim 1, wherein said alkyl functional silicone fluid has a molecular weight (Mw) of from about 1000 to about 100000, an Mn of from about 1000 to about 100000 and a polydispersity of from about 1 to about 5.

11. The release agent material of claim 1, wherein said non-functional silicone fluid has a molecular weight (Mw) of from about 1000 to about 100000, an Mn of from about 1000 to about 100000 and a polydispersity of from about 1 to about 5.

12. An image forming apparatus comprising:
a photoreceptor having a photosensitive layer; a charging device which charges the photoreceptor; an exposure device which exposes the charged photoreceptor to light, thereby forming an electrostatic latent image on a surface of the photoreceptor;
at least 5 developer stations for developing at least 5 toner images on a surface of the photoreceptor; at least one transfer device for transferring the toner images to a recording medium;
a fuser station for fixing the toner images transferred to the recording medium, onto the recording medium by heating the recording medium, thereby forming a fused image on the recording medium; and
wherein the fuser station comprises a fuser member, a pressure member and a release agent material in combination with said fuser member, the release agent material comprising:
a) an amino functional silicone fluid wherein the amino functional silicone fluid has the following Formula I:

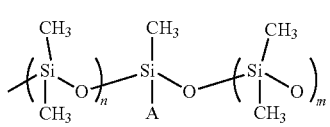

Formula I wherein A represents —R$_1$—X, wherein R$_1$ represents an alkyl group having from about 1 to about 10 carbons, and wherein X represents —NH$_2$ or —NHR$_2$NH$_2$ with R$_2$ having the same description as R$_1$;
b) a alkyl functional silicone fluid wherein the alkyl functional silicone fluid has the following Formula II:

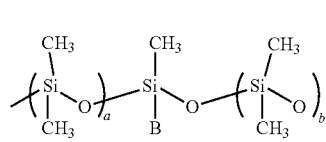

Formula II wherein B represents —(CH2)x-CH3, wherein x=0 to 17; a is from about 1 to about 11; and b is from about 10 to about 1,000; and
c) a non-functional silicone fluid wherein the non-functional silicone fluid has the following Formula III:

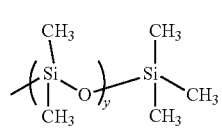

Formula III wherein y is from about 10 to about 5000;
wherein said agent material has a viscosity of from about 50 to about 1000 centipoise.

13. The image forming apparatus of claim 12, wherein said release agent material on a final copy substrate demonstrates an scratch test result of from about 1 to about 2.

14. A copy or print substrate comprising:
a first marking material layer, a release agent material blend coating layer positioned on said first marking material layer, an outer marking material layer positioned on said release agent material blend coating layer, and a release agent coating layer positioned on said outer marking material layer;
wherein said release agent coating layer comprises:
a) an amino functional silicone fluid wherein the amino functional silicone fluid has the following Formula I:

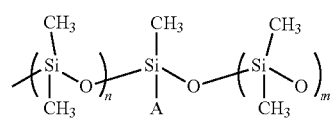

Formula I wherein A represents —R$_1$—X, wherein R$_1$ represents an alkyl group having from about 1 to about 10 carbons, and wherein X represents —NH$_2$ or —NHR$_2$NH$_2$ with R$_2$ having the same description as R$_1$;
b) an alkyl functional silicone fluid wherein the alkyl functional silicone fluid has the following Formula II:

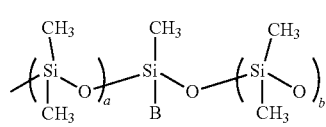

Formula II wherein B represents —(CH2)x-CH3, wherein x=0 to 17; a is from about 1 to about 11; and b is from about 10 to about 1,000; and c) a non-functional silicone fluid wherein the non-functional silicone fluid has the following Formula III:

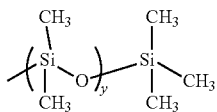

Formula III wherein y is from about 10 to about 5000.

15. The copy or print substrate of claim 14, wherein said release agent material blend coating layer comprises:

a) an amino functional silicone fluid wherein the amino functional silicone fluid has the following Formula I:

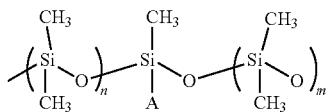

Formula I wherein A represents —$R_1$—X, wherein $R_1$ represents an alkyl group having from about 1 to about 10 carbons, and wherein X represents —$NH_2$ or —$NHR_2NH_2$ with $R_2$ having the same description as $R_1$;

b) an alkyl functional silicone fluid wherein the a alkyl functional silicone fluid has the following Formula II:

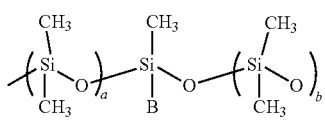

Formula II wherein B represents —(CH2)x-CH3, wherein x=0 to 17; a is from about 1 to about 11; and b is from about 10 to about 1,000; and c) a non-functional silicone fluid wherein the non-functional silicone fluid has the following Formula III:

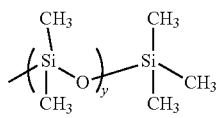

Formula III wherein y is from about 10 to about 5000.

* * * * *